No. 647,950. Patented Apr. 24, 1900.
G. L. DUTTENHAVER.
ANIMAL TRAP.
(Application filed Sept. 5, 1899.)
(No Model.)
Fig. I.
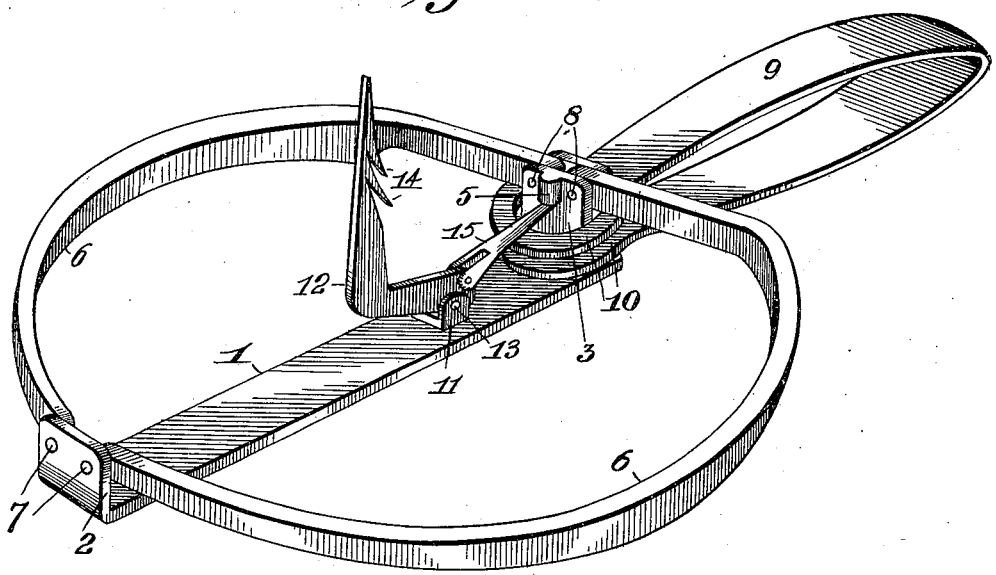
Fig. II.
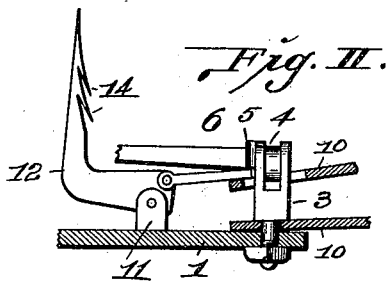
Fig. III.
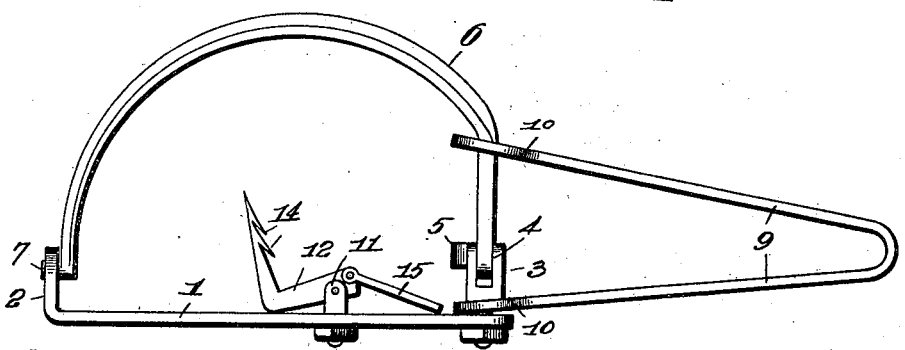
Inventor:
George L. Duttenhaver

UNITED STATES PATENT OFFICE.

GEORGE L. DUTTENHAVER, OF NEW ATHENS, ILLINOIS.

ANIMAL-TRAP.

SPECIFICATION forming part of Letters Patent No. 647,950, dated April 24, 1900.

Application filed September 5, 1899. Serial No. 729,491. (No model.)

*To all whom it may concern:*

Be it known that I, GEORGE L. DUTTENHAVER, a citizen of the United States, residing at New Athens, in the county of St. Clair and State of Illinois, have invented certain new and useful Improvements in Animal-Traps, of which the following is a full, clear, and exact description, reference being had to the accompanying drawings, forming part of this specification.

My invention relates to that character of animal-traps known as "steel traps," the prime feature of novelty constituting my improvement consisting of a retaining-lever arranged to hold the jaw-actuating spring compressed and a bait-receiving trigger arranged in connection with said lever, through means of which said lever may be released and the trap sprung.

My invention further consists in details of construction hereinafter fully described and claimed.

Figure I is a perspective view of my trap in open or set condition. Fig. II is a view, partly in side elevation and partly in section, of the retaining-lever and bait-receiving trigger and the parts with which they connect. Fig. III is a view in side elevation of the trap.

1 designates a frame-bar having an upturned lip 2 at one end. At the opposite end of this frame-bar is a post 3, bolted to the frame-bar and provided with a socket 4. On the inner face of the post 3 is a boss 5, the purpose of which will hereinafter appear.

6 designates the two jaws of the trap, provided with gudgeons 7, that are seated in the upturned lip 2 of the frame-bar 1, the opposite ends of the jaws being hinged in the socket 4 to the post 3 by pivot-pins 8.

9 designates a V-shaped spring the ends of which are formed with eyes 10, the lower one of which normally encircles the post 3, while the other eye is arranged to be lowered to the post 3 on the compression of the spring and the spreading of the jaws and travels upwardly, encircling the jaws and closing them when the trap is released, the operation being that of the well-known steel trap.

11 designates a bracket secured to the frame-bar 1 and arranged to receive a bait-receiving trigger 12, that is connected to the bracket by a pivot-pin 13. The bait-receiving trigger is in the shape of a bell-crank and is provided with prongs 14, adapted to retain any bait material that may be placed thereon. The bait-receiving trigger is connected to the bracket 11 near the end of its short arm, and pivoted to the extreme end of the short arm of the trigger is a lever 15, the free end of which is designed to engage beneath the boss 5 over the upper spring-eye 10 when the trap is in open or set position, as illustrated in Figs. I and II, whereby the spring is maintained in compressed condition.

In setting the trap for use the spring 9 is compressed to move the upper eye 10 thereof downwardly to the post 3. The jaws 6 are then spread, when they will rest upon the upper spring-eye. The lever 15 is next thrown over the upper spring-eye 10, and the pronged end of the trigger 12 being moved inwardly toward the spring 9 the lever is carried in a corresponding direction. The free end of the lever then engages beneath the boss 5 on the post 3 and retains the spring in compressed condition until such time as the pronged end of the trigger 12 is drawn upon by an animal attempting to withdraw the bait placed upon the trigger. The free end of the lever 15 becomes freed from the boss 5, and the spring 9 is relieved and causes the jaws 6 to be quickly moved toward each other to grasp the animal around the head or neck to hold it firmly.

I claim as my invention—

1. In an animal-trap, the combination of a frame-bar, a post carried thereby, a pair of jaws pivoted to said frame-bar and said post, a spring arranged to act upon said jaws, a bait-receiving trigger, and a lever pivoted to said trigger adapted to be thrown into engagement with said post and to hold said spring in compressed condition thereat, substantially as described.

2. In an animal-trap, the combination of a frame-bar, a post carried thereby, a boss on said post, a pair of jaws pivoted to said frame-bar and said post, a jaw-controlling spring having eyes surrounding said post, a pronged bait-receiving trigger pivoted to said frame-bar, and a lever pivoted to said trigger having a free end adapted to engage said boss and to hold said spring in compressed condition, substantially as described.

GEORGE L. DUTTENHAVER.

In presence of—
E. S. KNIGHT,
N. V. ALEXANDER.